United States Patent [19]

Riley

[11] Patent Number: 4,784,011

[45] Date of Patent: Nov. 15, 1988

[54] REMOTELY CONTROLLED REAR VISION MIRROR

[76] Inventor: Carl C. Riley, 507 W. Grant, Pittsfield, Ill. 62363

[21] Appl. No.: 60,760

[22] Filed: Jun. 11, 1987

[51] Int. Cl.$^4$ .............................................. F16C 1/10
[52] U.S. Cl. .................................... 74/502.1; 248/479
[58] Field of Search ............ 74/501 M, 501 R, 501 A, 74/502, 503; 350/626, 279; 248/479, 480

[56] References Cited

U.S. PATENT DOCUMENTS

| | | | |
|---|---|---|---|
| 2,843,018 | 7/1958 | Cooper et al. | 74/501 M |
| 3,119,591 | 1/1964 | Malecki | 74/501 M |
| 3,245,283 | 4/1966 | Van Noord | 74/501 M |
| 3,261,226 | 7/1966 | Dent | 74/501 M |
| 3,277,678 | 10/1966 | Booth | 74/501 M |
| 3,476,464 | 11/1969 | Clark | 74/501 M |
| 3,480,355 | 11/1969 | Smith | 74/501 M |
| 3,537,778 | 11/1970 | Kurz | 74/501 M |
| 3,545,290 | 12/1970 | McCord et al. | 74/501 M |
| 3,550,470 | 12/1970 | Brighton et al. | 74/501 M |
| 3,724,928 | 4/1973 | Olsen et al. | 74/501 M |
| 3,751,141 | 8/1973 | Brown | 74/501 M |
| 3,825,324 | 7/1974 | Brewington | 74/501 M |
| 3,924,938 | 12/1975 | Carson | 74/501 M |

FOREIGN PATENT DOCUMENTS 863162  2/1971  Canada .............................. 74/501 M Primary Examiner—Gary L. Smith
Assistant Examiner—Vinh Luong
Attorney, Agent, or Firm—John A. Hamilton

[57] ABSTRACT

A rear vision mirror especially adapted for use at the right side of truck cabs consisting of a frame attachable to the right side door of the truck cab and projecting outwardly therefrom, a vertically disposed mirror mounted in the frame for pivotal movement about a vertical axis, an adjusting and locking device mounted inside of the cab and operable by the driver, and an operating connection between the adjusting and locking device and the mirror, such that the adjusting and locking device is rendered operable to turn the mirror adjustably on its vertical axis to vary the scope and angle of the rear vision provided thereby, and to lock the mirror at the desired angle.

1 Claim, 2 Drawing Sheets

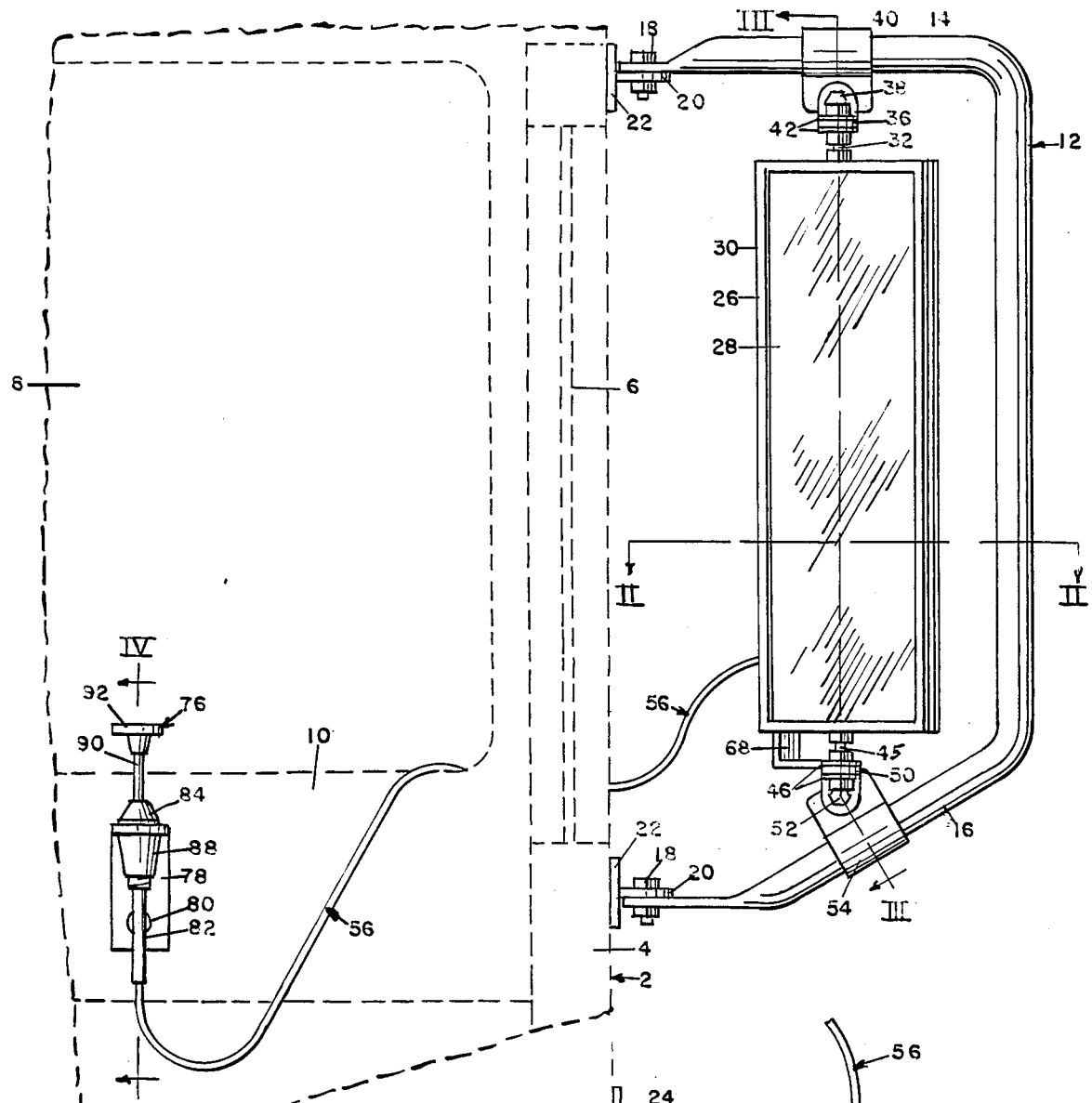
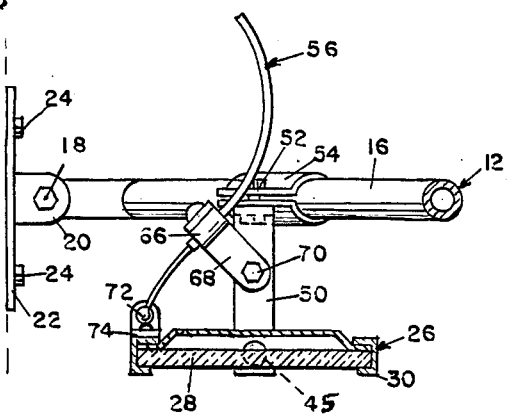
FIG. 1
FIG. 2

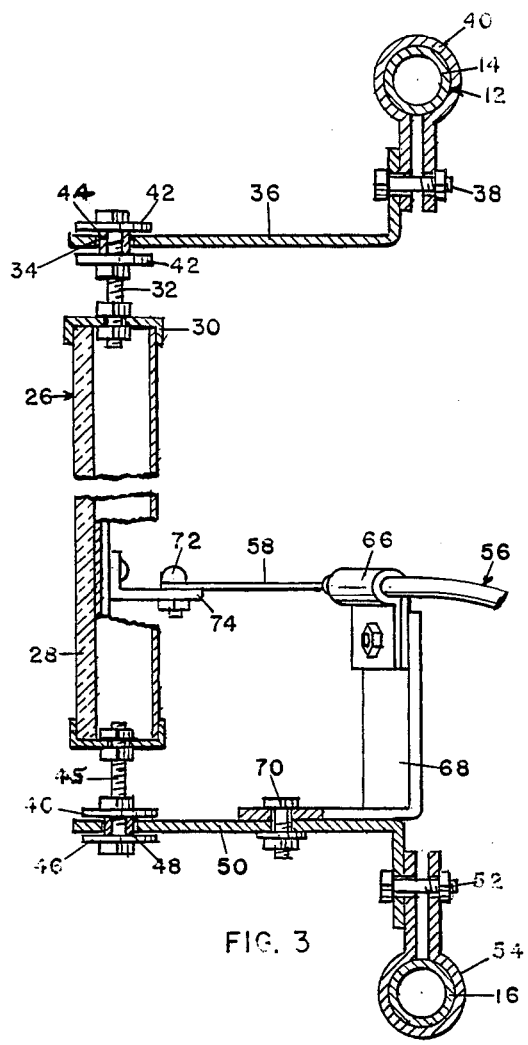
FIG. 3
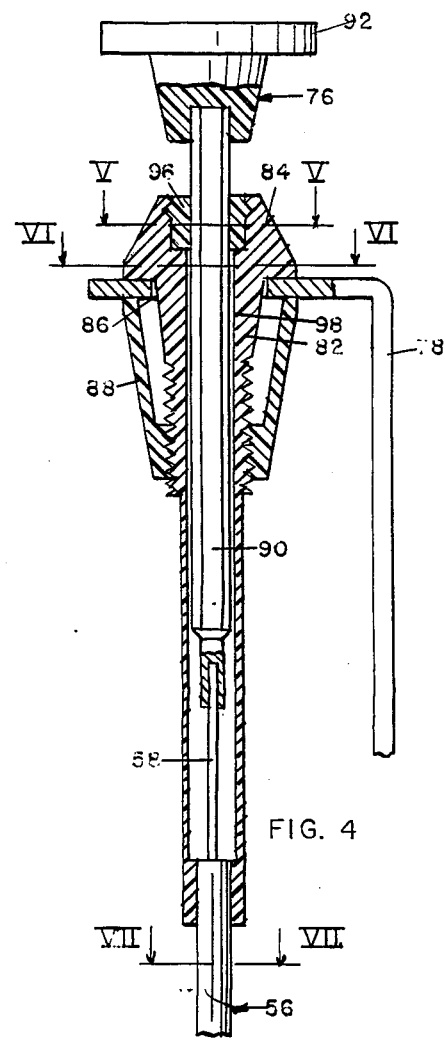
FIG. 4
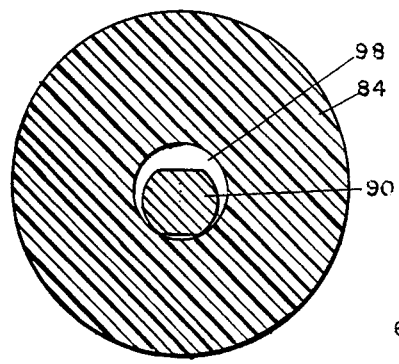
FIG. 6
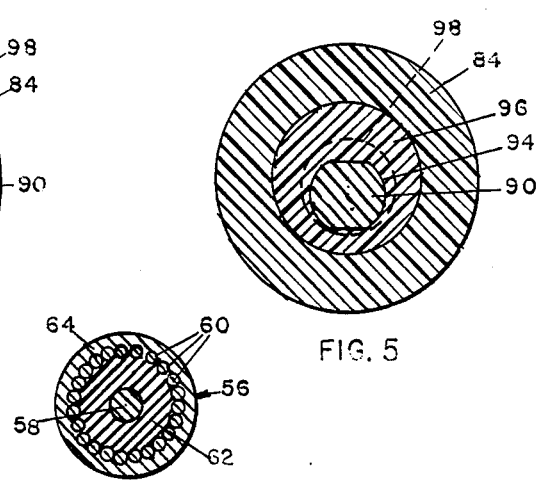
FIG. 5
FIG. 7

REMOTELY CONTROLLED REAR VISION MIRROR

This invention relates to new and useful improvements in automotive equipment, and has particular reference to rear vision mirrors for use particularly in trucks.

Although the present rear vision mirror is usable in automotive vehicles generally, it has been designed particularly for use in trucks, and especially for use in providing rear vision at the right side, or passenger side, of the truck. At that side of the vehicle, the rear vision mirror presents certain problems. The driver should be provided not only with good general rear vision, extending well outwardly from the right side of the vehicle, for aiding ordinary driving, but also with a more restricted rear vision closely and directly along the right side of the vehicle, for aiding and facilitating accurate backing of the vehicle when maneuvering in close quarters. A truck driver is commonly required to back his vehicle with great accuracy when backing into loading docks and the like. Rear vision mirrors commonly provided for trucks usually are quite large, and their adjustment for different angles of rear vision are usually manual, and often require substantial amounts of time to accomplish, which is not available during any continuous stint of driving. A mirror set for one type of rear vision is not ordinarily capable of providing the other type. Accordingly, the principle object of the present invention is the provision of a rear vision mirror which effectively solves the difficulties described above.

More specifically, an object of the present invention is the provision of a rear vision mirror in which the mirror itself is mounted externally of the truck cab for free rotation on a vertical axis by a suitable mounting structure, and means operable from the interior of the cab by the driver to turn said mirror on said vertical axis to provide the desired angle of rear vision, and to lock said mirror securely against turning when the desired angular setting thereof has been attained.

Another object is the provision of a rear vision mirror of the character described in which the means for pivoting the mirror comprises a flexible drive cable consisting of a flexible wire enclosed in a flexible sheath. The outer end of the sheath is fixed to the mirror mounting means, and the extended wire is attached to the frame of the mirror itself. The end of the cable sheath disposed interiorly of the truck cab is affixed relative to the truck structure, and means are provided for pushing and pulling the inner end of the wire to slide it longitudinally through the sheath to pivot the mirror. This type of drive is convenient in that it permits the drive cable to be lead inside of the truck cab by various routes without admitting outside air to the cab when such is not desired or is uncomfortable. It renders the mirror applicable to nearly any truck as added equipment.

A further object is the provision of a rear vision mirror of the character described with the addition of means whereby the wire of the drive cable may be securely and conveniently locked against longitudinal movement through the sheath of the cable, whereby the mirror itself is securely locked at any desired angular setting.

Other objects are simplicity and economy of construction, and efficiency and dependability of operation.

With these objects in view, as well as other objects which will appear in the course of the specification, reference will be had to the accompanying drawing, wherein:

FIG. 1 is a rear elevational view of a rear vision mirror embodying the present invention, shown operatively mounted on the right side of a truck cab, the truck being shown fragmentarily in dashed lines, FIG. 2 is a fragmentary sectional view taken on line II—II of FIG. 1, with the mirror turned to a vertical plane transverse to the truck, FIG. 3 is an enlarged, foreshortened sectional view taken on line III—III of FIG. 1, with the mirror shown in the position of FIG. 2, FIG. 4 is an enlarged, fragmentary sectional view taken on line IV—IV of FIG. 1, FIG. 5 is an enlarged sectional view taken on line V—V of FIG. 4, FIG. 6 is an enlarged sectional view taken on line VI—VI of FIG. 4, and FIG. 7 is an enlarged sectional view taken on line VII—VII of FIG. 4.

Like reference numerals apply to similar parts throughout the several views, and the numeral 2 applies generally to a fragmentary view of a truck, shown in dashed lines in FIG. 1. Included are the right side cab door 4 having a window 6, the windshield 8, and the dashboard 10. The rear vision mirror forming the subject matter of the present invention includes a generally C-shaped frame 12 formed of tubular stock, its upper leg 14 and lower leg 16 each being clampingly affixed by a bolt 18 to a horizontal ear 20 projecting outwardly from a mounting plate 22 affixed to door 4 as by screws 24, respectively above and below window 6, so that the frame bridges the window vertically A mirror assembly 26, consisting of a mirror glass 28, mounted in a mirror frame 30, is disposed generally between the upper and lower legs 14 and 16 of frame 12, with the glass disposed generally in a vertical plane. The mirror assembly is freely pivotal on its vertical axis by means best shown in FIG. 3. A vertical bolt 32 is fixed in the upper end of mirror frame 30, and extends upwardly through a loosely fitting hole 34 formed in the free rearward end of an arm 36, the forward end of said arm being bent upwardly and secured by bolt 38 to the downwardly extended arms of a C-clamp 40 surrounding upper frame leg 14. Bolt 38 serves both to mount arm 36 rigidly, and also to draw C-clamp 40 tight. A pair of washers 42 are disposed on bolt 32 respectively above and below arm 36, and a bushing 44 of slightly greater length than the thickness of arm 36 is mounted on the bolt between the washers so that they cannot be clamped against the arm, and the bolt may turn freely relatively to the arm. Similarly, the lower end of the mirror frame is connected to the lower leg 16 of frame 12 by a downwardly extending bolt 45, washers 46, bushing 48, arm 50, bolt 52 and C-clamp 54. Thus the mirror assembly, while firmly mounted, may pivot freely on bolts 32 and 44, which are coaxial, and may be viewed through window 6.

The mirror assembly 26 may be adjustably turned on its vertical axis by means including a flexible drive cable indicated generally by the numeral 56. As indicated in FIG. 7, said drive cable consists of a spring steel core wire 58 enclosed in and extending through a sheath consisting of a large number of fine spring steel wires 60 arranged to form a tube, the space between said wires and core wire 58 being filled by a soft Neoprene material or the like 62, and the exterior surface of the cable being formed by a sheath 64 of flexible, weatherproof material. The cable is flexible, and the core wire 58 may be pushed longitudinally therethrough by pressure applied to either end thereof, so long as the cable is not kinked or flexed to curves of short radii. One end of cable 56 is disposed exteriorly of the truck cab, its sheath being secured by a clamp 66 to an angled arm 68 clamped by bolt 70 to the arm 50 carrying the lower end of the mirror assembly. The core wire 58 is extended from this end of the cable and affixed by bolt 72 to a bracket 74 affixed to the rearward side of mirror frame 30 in laterally spaced apart relation to the pivotal axis of the mirror assembly. The cable is then passed into the interior of the truck cab, for example through the soft rubber or Neoprene molding of windshield 8 so as not to cause a weather leak therearound. It also could be passed through the molding of window 6, or through holes specially formed therefor in the structure of door 4 or through the vehicle body. Within the truck cab, the cable is connected to an adjusting and locking device indicated generally by the numeral 76.

The adjusting and locking device 76 is best shown in FIGS. 4–6, and is carried by an angled bracket 78 secured as by screws 80 (one shown) to any portion of the truck structure within easy reach of the driver, such as to dashboard 10. The device includes a tubular body member 82, formed of plastic or other suitable material, having an enlarged head 84, and being insertable downwardly through a hole 86 formed therefor in bracket 78, and secured therein by a nut 88 threaded thereon below the bracket. The inner end of the sheath of drive cable 56 is affixed in the lower end of body member 82, and the core wire 58 is extended upwardly within said body member and affixed in the lower end of a rigid spindle 90. Said spindle projects upwardly through the full length of the body member, and upwardly therefrom, having a handle 92 affixed to its extended upper end. The spindle is non-circular in cross-sectional contour, and projects slidably through a correspondingly shaped orifice 94 (see FIG. 5) formed in a cylindrical plug 96 fitted rotatably into the upper end of the head 84 of the body member 82. The orifice 94 is eccentric to the axis of said plug. The bore 98 of the body member is also eccentric to the axis of plug 96, but to a lesser degree than orifice 94. When the eccentricities of orifice 94 and bore 98 are disposed at the same angular position relative to the plug, as shown in FIG. 5, spindle 90 may be slidably moved freely in a longitudinal direction, by manual pressure applied to handle 92, but when the handle is turned angularly, the spindle forces plug 96 to turn also, due to the non-circular configurations of the spindle and orifice 94, and this rotation of the plug forces the portion of the spindle beneath the plug into tight wedging engagement with the wall of body member bore 98, ad the spindle is thus locked both against longitudinal movement, and also against further rotary movement.

Operation of the device is believed to be reasonably self-evident from the foregoing description of its construction. The mirror assembly 26 may be adjusted forwardly or rearwardly, in order to be most conveniently viewable by the driver of the truck when seated in his usual position and posture in the driver's seat, by loosening bolts 18 slightly and pivoting frame 12 forwardly or rearwardly on said bolts until the desired position is obtained, and then re-tightening said bolts. The driver may then adjust the angularity of the mirror assembly on its pivot bolts 32 and 44, in order to provide the desired ranges of rear vision along the right side of the truck, by operation of adjusting and locking device 26. The driver first rotates handle 92 to obtain the "neutral" position of spindle 90 and plug 96 relative to bore 98 of body member 82, and then raises or lowers the handle to slide the spindle and move core wire 58 of drive cable 56 longitudinally within the cable to adjust the angularity of mirror assembly 26 as desired. When the desired angularity is attained, the driver rotates handle 92 in the opposite direction to wedge and lock the spindle against the bore 98 of body member 82. The slight rotation of handle 92 necessary to lock or unlock the spindle of course introduces some slight torsion in core wire 58, but the cable is of such length that it can easily absorb and accommodate such torsion, since the locking and unlocking is usually accomplished by a quarter of a turn, or less, of handle 92.

While I have shown and described a specific embodiment of my invention, it will be readily apparent that many minor changes of structure and operation could be made without departing from the spirit of the invention.

What I claim as new and desire to protect by Letters Patent is:

1. A remotely controlled rear vision mirror for automotive vehicles comprising:
   a. a frame adapted to be mounted on the external side of a door of a vehicle,
   b. a mirror mounted in said frame for pivotal movement on a vertical axis, and being disposed in a generally vertical plane,
   c. an adjusting and locking device adapted for mounting within said vehicle, said adjusting and locking device including:
      i. a tubular body member adapted to be fixedly related to said vehicle,
      ii. a rigid spindle disposed within said body member and axially slidable therein, one end of said spindle projecting from said body member and the other end thereof being affixed coaxially to the associated end of the wire of said drive cable,
      iii. a handle affixed to the projecting end of said spindle, whereby said spindle may be moved longitudinally in said body member or turned about its axis, and
      iv. locking means operable by turning said handle about its axis to lock said spindle against either type of movement relative to said body member, wherein said locking means includes a plug carried rotatably in one end of said body member, said spindle being non-circular in cross-sectional contour in passing through a matching non-circular aperture formed in said plug eccentrically to the axis of said plug, whereby rotation of said handle and spindle also forces rotation of said plug, the bore of said body member adjacent said plug also being eccentric to the axis of said plug, said spindle being axially slidable through said plug and bore only when the plug is turned to align the eccentricity of said spindle angularly with that of said body member bore, whereby rotation of said plug by said handle will wedge said spindle tightly against the wall of said body member bore to lock said spindle against motion relative to the body member, and
   d. means interconnecting said adjusting and locking device to said mirror whereby the former is rendered capable of pivoting said mirror on its vertical axis, and of locking said mirror against pivotal movement, said interconnecting means including a drive cable adapted to be led from the exterior to the interior of said vehicle, and comprises a flexible wire enclosed in a flexible sheath, longitudinally sliding movement of said wire within said sheath being operable to pivot said mirror, and wherein said adjusting and locking means comprises means operable alternately either to slide said wire within said sheath, or to lock said wire against such movement, wherein the end of the sheath of said drive cable adapted to be led into the interior of said vehicle is affixed to said tubular body member, and wherein the end of said wire is extended from said sheath and connected to said other end of said spindle.

* * * * *